United States Patent [19]

Hopfenberg et al.

[11] 3,904,562
[45] Sept. 9, 1975

[54] ORGANIC PIGMENTS ENCAPSULATED WITH VINYLPYRROLIDONE POLYMER

[75] Inventors: Harold B. Hopfenberg, Raleigh, N.C.; Thomas C. Rees, Park Forest South, Ill.

[73] Assignee: The Sherwin-Williams Company, Cleveland, Ohio

[22] Filed: Jan. 31, 1973

[21] Appl. No.: 328,201

[52] U.S. Cl. ... 260/22 CB; 106/288 Q; 106/308 M; 106/309; 117/100 A; 260/23 H; 260/29.6 HN; 260/34.2; 260/42.16; 260/42.54; 260/42.55
[51] Int. Cl.².. C08K 9/04; C08K 9/10; C08L 91/00
[58] Field of Search ............ 260/41, 42, 16, 42.54, 260/42.55, 22 CB, 23 H, 29.6 HN; 106/308 M, 309, 288 Q; 117/100 A

[56] References Cited
UNITED STATES PATENTS

| | | | |
|---|---|---|---|
| 2,282,527 | 5/1942 | Morrison | 106/259 |
| 2,379,237 | 10/1940 | Jenkins | 260/42.55 |
| 3,069,370 | 12/1962 | Jensen | 260/42.16 |
| 3,133,893 | 5/1964 | Newman | 260/41 |
| 3,215,663 | 11/1965 | Weisberg | 260/41 |
| 3,492,253 | 1/1970 | Katz | 106/308 N |

FOREIGN PATENTS OR APPLICATIONS 834,160  5/1960  United Kingdom

OTHER PUBLICATIONS

Schildknecht Calvin E., "Vinyl & Related Polymers," John Wiley & Sons, New York, 1952, p. 665.

*Primary Examiner*—James H. Derrington
*Attorney, Agent, or Firm*—Richard G. Smith; Lowell G. Wise; James V. Tura

[57] ABSTRACT

Organic pigments are coated with a vinylpyrrolidone polymer layer by precipitating polymer from aqueous solution. These encapsulated pigments have superior bleed resistance, light fastness and impart gloss retention to organic coating films.

18 Claims, No Drawings

ORGANIC PIGMENTS ENCAPSULATED WITH VINYLPYRROLIDONE POLYMER

BACKGROUND OF THE INVENTION

This invention relates to the field of organic pigments. In particular, it provides new encapsulated pigments and manufacturing methods for depositing a vinylpyrrolidone polymer on the surface of pigments. Further, this invention provides methods for encapsulating organic pigments and incorporating the coated pigments in organic vehicles.

Surface treatment of finely divided particles has drawn interest from prior art workers because of the improved properties which are obtainable in such processes. Particular characteristics which are often sought by surface treatment include thermal stability, resistance to strong solvents, dispersibility, color retention, chemical inertness and light fastness. Chemically active organic pigments are particularly enhanced by such treatments.

Encapsulated organic pigments may be used in protective and decorative coatings, such as paints, varnishes and lacquers, and find utility in aqueous dispersions or latexes as well as in organic solvent based coatings. Such pigments are also used in printing inks, fabric colors and in mass coloration of plastics.

Organic particles can be protected from incompatible substances when incorporated in other products by coating with a continuous layer of organic polymer, and oxidative degeneration caused by contact by air with the organic pigment can be avoided. In addition to preventing attack of the pigment core by outside reactants, a polymeric coating can help suppress undesirable odors and taste from a noxious pigment, thus extending the utility of many pigments.

Polymer-coated pigments are readily dispersible in other organic resins or in a solution of polymeric material, such as oleoresinous coating vehicles, plasticizing components, and polymer compositions prepared as master color batches for spinning, molding or extruding. Surface coatings containing these polymer-coated pigments are characterized by fine dispersion and high chromaticity.

Several processes are known which result in discrete polymer-coated pigment particles or aggregates of resin-bonded pigments. For instance, it is possible to stabilize the pigment in a state of fine dispersion and pigmentary dimensions, so that the individual pigment particles are coated with a polymer which is polymerized in situ. In such processes, it is usually necessary to suspend the pigment core particles in a liquid reaction medium, frequently requiring the use of a dispersing agent. It is known to coat pigments by this method with a thermoplastic, linear addition polymer of a compound containing the polymerizable ethylene group. This prior art process is usually employed with aqueous presscakes of the pigment to be coated, which are dispersed in an aqueous polymerization medium with a monomer and catalyst, and is described in detail in U.S. Pat. No. 3,133,893.

In other prior art methods for coating organic particles, it is known to coat solid particles with polymers separated from an organic solvent solution of the polymer. In such methods, an organic solvent solution of the polymer is used as a dispersing medium wherein the organic particles are uniformly dispersed. At this point an organic non-solvent for the polymer can be mixed with the dispersion, displacing the polymer. A polymer-rich liquid phase then separates from the liquid and coats the dispersed particles. This method is difficult to carry out because of the adhesion of the tacky polymer-coated particles. The aggregates formed by this method are difficult to handle and require additional processing, such as grinding, which may produce a non-uniform coated product. Complete recovery of the coated organic particles by such prior art processes is another problem, resulting in higher production costs. It is known to coat various pigmentary materials with phase-forming polymers, both synthetic and natural in origin. Homopolymers and interpolymers of styrene, maleic acid, ethylene, propylene, alphaolefins, vinyl acetate, vinyl chloride, vinylidene fluoride, and other ethylenically-unsaturated monomers are known which are suitable for coating pigments. Also, modified natural polymers, polymers, such as cellulose acetate, cellulose butyrate, ethylcellulose and various rubber materials can be applied as coatings to organic particles by the prior art organic solvent displacement techniques. In general, the polymers are dissolved in a liquid organic solvent, such as halogenated hydrocarbons, ketones, and aromatic solvents having a high solubility parameter for the polymers. After dispersing the solid particles in this polymer solution, an organic non-solvent which is miscible with the organic solvent and inert to the pigment is mixed with the dispersion. These non-solvents can be aliphatic hydrocarbons or alcohols.

SUMMARY OF THE INVENTION

It has been discovered that organic pigments can be provided with a uniform coating of a vinyl pyrrolidone polymer by a novel process wherein the polymer is precipitated onto a pigment core by displacing the polmer from aqueous solution with another solute, i.e., by salting out. In this process, organic pigment particles in a finely divided state are slurried in an aqueous solution of polymer, and the polymer is precipitated onto the surface of discrete particles to encapsulate the pigment with a layer of at least 10 Angstrom units thickness. The encapsulated pigment is separated from the aqueous mixture and may be recovered as a dry toner powder. In a preferred embodiment, an aqueous presscake of the encapsulated pigment is treated by a flushing process to transfer the pigment from the dispersed aqueous phase to an oleoresinous organic phase.

The invention is especially useful for encapsulating organic pigments having polar groups, such as toluidine red or hansa yellow. These treated pigments are easily dispersed in organic compositions, such as surface coatings, color batches, etc.

DESCRIPTION OF PREFERRED EMBODIMENTS

In the practice of the present invention an encapsulated pigment is prepared which consists essentially of a solid core or colored organic pigment and an outer layer of a transparent vinyl pyrrolidone polymer deposited on the core. The pigment core has an average particle size in the range of about 0.1 to 10 microns, and the outer layer has a thickness of at least 10 A and up to about 1.6 microns average thickness. On a weight ratio basis, the amount of polymer may be from about 5 to 100 parts per 100 parts core pigment. For most purposes an outer layer of polymer of about 20 to 50% by weight of the pigment core is suitable.

The encapsulated pigment is prepared by a precipitation process wherein the organic pigment particles to be treated are slurried in an aqueous solution of the vinyl pyrrolidone polymer. The polymer is precipitated onto the pigment particles by displacing the polymer from the aqueous solution with a water-soluble substance to encapsulate the pigment as substantially discrete particles having a uniform polymer layer of at least 10 Angstrom units thickness. The encapsulated pigment is separated from the aqueous mixture and recovered as a presscake or in other suitable form for pigment finishing operations.

In general, the vinyl pyrrolidone polymers used in the precipitation process are those water soluble linear addition polymers containing at least 90 percent repeating units of the structure:

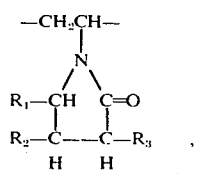

where $R_1$, $R_2$ and $R_3$ are selected independently from hydrogen and lower alkyl radicals having 1 to 4 carbon atoms.

The vinyl pyrrolidone monomer may be copolymerized with a minor amount of an ethylenically unsaturated compound, in particular, the acrylic esters, such as stearyl acrylate or hydroxy-substituted alkyl esters of acrylic acids.

Best results are obtained when the molecular weight of the polymer is at least about 300,000. The vinyl pyrrolidone polymers are highly impermeable to and substantially insoluble in organic solvents used in protective and decorative coatings, such as aromatic, aliphatic and alicyclic hydrocarbons. Most organic coating vehicles have a refractive index of about 1.5, which is closely matched by the colorless polymer coating. This preserves the color value of the pigment core.

A principal advantage of the present invention is the degree to which the encapsulation treatment renders the pigment insoluble in organic vehicles. Azo pigments are usually soluble in aromatic solvents such as toluene and xylene, found in ordinary paint systems. This results in bleeding, which occurs when an article painted with a cotaing composition containing an untreated bleeding type pigment is overpainted with a white or light-colored paint. The underlying pigment dissolves very slightly into the fresh paint vehicle and migrates into the differently colored layer. By coating the bleeding type pigment with an insoluble and impermeable film of vinyl pyrrolidone polymer, the tendency to dissolve and bleed will be greatly reduced or totally eliminated. In addition to the improved bleeding properties, the coating pigments have less tendency to cause "blooming" or loss of gloss in a paint film.

Another principal advantage of the present invention is the improvement in light-fastness of azo pigments encapsulated with vinylpyrrolidone polymers and in gloss retention of exposed films containing these pigments. We have found that these two effects are related in that exposure to UV light (or sunlight) apparently causes a photoreduction of the azo group by the vehicle to a hydrazo configuration which subsequently undergoes further reaction leading to colorless products. The vehicle is simultaneously oxidized and gradually acquires a rough surface and a network of cracks, easily visible under the microscope, which results in loss of gloss of the paint film. The insulation of the pigment surface from the vehicle by means of a continuous impermeable insoluble non-reactive material such as a polyvinylpyrrolidone prevents, or greatly retards, this reaction. Confirmation of this effect is found with metallized azo pigments such as Permanent Red 2B. These pigments are extremely fugitive to UV light, even in full shades, but do not cause gloss loss of paint films. Apparently, these pigments undergo self-reaction sensitized by their heavy metal components. Encapsulation of these pigments with polyvinylpyrrolidone does not affect their lightfastness or gloss retention, thus demonstrating that the coating is not acting as a UV screen, but as a barrier between pigment and vehicle.

The displacement of the organic polymer from aqueous solution, sometimes called precipitative extraction or "salting out" is usually carried out at ambient temperature or with chilling. The aqueous polymer solution is caused to split into two phases by the addition of a third substance, which may be an organic liquid solvent or an inorganic solid having high affinity for water. The distribution of water and polymer between these two phases is such as to effect their separation. The conditions are maintained such that one of the phases separating is a viscous liquid, which is deposited on the individual solid pigment particles present in slurry form, and evenly dispersed throughout the aqueous polymer solution. In separation of this type the two phases separated usually contain both the water and the polymer in varying amounts. Some of the polymer remains in the aqueous liquid phase, and some of the water is precipitated with the polymer.

In the so-called "salting out" process an organic salt, such as sodium sulfate, is added along with sufficient water to retain the salt solute in complete solution. In other applications the separation of vinyl pyrrolidone polymer from water solution can be effected by addition of a strongly hydrophilic organic solvent, such as liquid ketones, etc., in which the polymer is substantially insoluble.

The conditions under which the precipitation is carried out can vary with the type of polymer being displaced, the concentration of polymer in the aqueous phase, and the displacement solute (salt or organic liquid) addition. Temperature is usually maintained at about ambient and the best operating temperature can be optimized for the individual process with little effort. Where the addition of displacement solute might cause a large rise in temperature due to solution heat or other causes, chilling the slurry may be helpful in obtaining greater separation of the polymeric phase. Usually, the operating temperature for this step is maintained at about 15°–40°C; however, higher or lower temperatures may be utilized without harmful affect or loss of economy in many processes.

The concentration of polymer in the aqueous phase during precipitation can vary considerably. Usually the starting concentration from about 1% up to the saturation concentration is employed. For the poly (N-vinyl-2-pyrrolidone) used herein, about 3–4 wt% is preferred, although 1–10% may be used.

In the precipitation step, the vinyl pyrrolidone polymer is displaced from aqueous solution by a water-soluble substance. Of the inorganic salts, sodium sulfate ($Na_2SO_4$) is preferred; however, numerous water soluble inorganic salts can be used successfully, either alone or in mixture with other precipitating agents. Potassium carbonate ($K_2CO_3$), magnesium sulfate ($MgSO_4$) and ammonium sulfate (($NH_4)_2SO_4$) have been found to be useful in this step. In general, the anion is more important than the cation in determining the efficacy of a salt as a precipitating agent. Organic liquids which are miscible with water and are not solvents for the vinyl pyrrolidone polymer may be used as precipitants. Ketones, such as acetone ($CH_3COCH_3$), are useful for this purpose.

After the precipitation step has been carried out, it is necessary to recover the encapsulated pigment from the aqueous mixture. Mechanical separation can be effected with filtration equipment or by centrifuging. The aqueous mixture of water, polymer and precipitating agent can be washed from the encapsulated pigment particles with acetone or other suitable liquid and recovered for regeneration and reuse. For instance, ionic precipitating agents such as inorganic salts can be separated from the non-ionic polymer by electrophoresis using semi-permeable membranes to separate catholyte, anolyte and polymer-rich streams.

Where a substantial quantity of water is coprecipitated with the polymer, it may be necessary to treat the encapsulated pigment to remove excess water. This results not only in a hardened product, but also in less aggregates for dry toners. Contacting the encapsulated pigment with acetone helps remove water. Sublimation of the water during freeze drying may also be used to remove excess water from the encapsulated pigments.

One of the best ways to recover the encapsulated pigments made by the present process is the flushing method, which produces an excellent dispersion of the particles in a soft oleoresinous vehicle. In this procedure the organic pigment particles are transferred from an aqueous dispersion to an organic hydrophobic vehicle by mixing the aqueous pigment dispersion in a suitable vessel. This finishing step should be carried out without excessive shear or attrition to avoid breaking the polymer layer. The major amount of water introduced to the flushing vessel can be removed by conventional mechanical separation procedures, such as decanting. When an aqueous presscake or slurry of the encapsulated organic pigment is mixed with an organic liquid or soft resin vehicle, such as bodied triglyceride oils, synthetic resins, organic plasticizers, etc., the pigment particles are transferred from the aqueous phase to the organic phase spontaneously by nature of their physical and chemical properties. In the typical flushing operation, sufficient organic vehicle is emulsified with the pigment in water slurry, and then the emulsion breaks to provide a continuous coating of the pigment with the vehicle. It is customary to add about 100 to 900 parts or organic vehicle per 100 parts of pigment on the dry basis.

The pigments which can be treated successfully by the present process include those finely divided colored organic pigments having polar groups, for example azo pigments, or other pigments having carboxyl polar groups or active hydrogen. Typical azo pigments which may be treated with a vinyl pyrrolidone polymer to provide an encapsulated pigment comprise Toluidine Red (C.I. Pigment Red 3), Hansa Yellow G (C.I. Pigment Yellow 1), Hansa Yellow 10G (C.I. Pigment Yellow 3), pyrazolones such as Hansa Yellow R (C.I. Pigment Yellow 10), benzidine pigment such as C.I. Pigment Yellow 12, Dinitraniline Orange such as C.I. Pigment Orange 5, chloronitraniline reds such as C.I. Pigment Red 4, betaoxnaphthol red such as Watchung Red, and Toluidine Maroon such as C.I. Pigment Red 18. Metallized azo pigments such as 2B Red and Lake Red C may be encapsulated, but are not significantly improved by the vinyl pyrrolidone treatment. In addition to the azo pigments, perylene reds, indigo, thioindigo and indanthrone pigments may be encapsulated with a suitable vinyl pyrrolidone polymer. In general the process may be used for treating an organic pigment core which does not itself possess the desired properties of light fastness, inertness, thermal stability, bleed resistance, etc. and which does not react deleteriously with the encapsulating polymer. It is believed that the highly polar amide groups of the polymer interact with the polar groups of the pigment surface, forming Van der Waal type bonds. Light fastness of an azo pigment may be improved substantially by encapsulating it with a poly (vinyl pyrrolidone). This improvement may be attributed to a barrier effect to active hydrogen groups. Organic coating resins and solvents sometimes have active hydrogens which may photochemically reduce the azo groups of the uncoated pigment core. Most oil base paints, in particular those made with alkyd resins, contain some hydroxyl and carboxyl groups. By preventing contact of the organic pigment surface with an active hydrogen, the light fastness of the pigment and gloss retention of the film may be improved.

Another pigment property which may be important is the hydrophilic/lipophilic balance of the organic pigment. When the polymer is displaced from water solution it comes out of solution as a viscous material containing water of solvation. Since polymeric composition is somewhat more lipophilic than water, it should wet the organic pigment surface preferentially.

The invention is represented by specific examples, wherein the units given are parts by weight unless otherwise stated.

EXAMPLE 1

A presscake of finely divided toluidine red pigment containing 25 grams by weight of pigment solids in 58.9 grams of water is dispersed with a high shear blendor in a solution of 25 grams poly (N-vinyl-2 pyrrolidone) in 600 grams of water. The polymer has an average molecular weight ($M_a$) of 360,000. To the dispersed mixture is added 200 ml. aqueous sodium sulfate solution (17% $Na_2SO_4$) at a rate of about 5 ml./minute for the first 100 ml. and 2 ml./minute for the last 120 ml. The resulting dispersion is stirred for 10 minutes and permitted to settle before separating the water by decanting. The encapsulated pigment is treated with 200 gm. of acetone and the mixture is stirred in a high shear blendor for a few minutes, filtered and dried. The product is redispersed in 200 grams of acetone, filtered and dried. After light grinding or crushing, the product is a free-flowing powder of discrete particles having a continuous coating of polymer on the pigment core. The toluidine red pigment core is about 45% of the composite pigment.

The encapsulated pigment is compared with untreated toluidine red for solvent resistance. The untreated pigment dissolves completely in excess xylene; however, the encapsulated pigment, when placed in the same excess of xylene, colored the solvent, but undissolved particles remained after more than 6 months in contact with the larger amount of xylene.

EXAMPLE 2

The procedure of Example 1 is repeated except that the polymer has a molecular weight of about 40,000 and 300 ml. of sodium sulfate is required to precipitate the polymer. The resulting product resisted xylene solvent for the test period of more than 15 days.

EXAMPLE 3

A stock solution of poly (N-vinyl pyrrolidone) is prepared by dissolving 100 grams of a commercial polymer (Matheson, Coleman and Bell, K-90) having an average molecular weight of about 360,000 in 1,200 ml. of distilled water. A 300 ml. portion of this solution is fractionated by treatment with a 17% aqueous solution of sodium sulfate salt by dropwise addition of the salt until the mixture separates or becomes turbid. Thereafter, the salt solution is added in 2 ml. increments until the mixture separates into two layers on standing. The lower polymer layer, containing about 20.8 grams of polymer, is slurried with an aqueous presscake containing 25 grams of toluidine red pigment and made to a total volume of 300 ml. by addition of more water. The mixture is dispersed in a high shear blendor and a total of 180 ml. of 17% salt solution is added at the following rates: first 100 ml. at 5 ml./min., second 40 ml. at 2 ml./min., and third 40 ml. at 1 ml./min. The mixture is stirred for 10 minutes and vacuum filtered to give a sticky mass of encapsulated pigment. The pigment mass is dried for about 16 hours at 50°C in a blower oven to remove volatile components and ground. The encapsulated product has excellent resistance to xylene solvent. Following the fractionation treatment, the polymer is shown by gel permeation chromatography to have a higher average molecular weight ($M_a$) than unfractionated polymer. The use of fractionated polymer facilitates the comminution or separation of aggregates without post-treatment with acetone.

EXAMPLE 4

Toluidine red is encapsulated in a high molecular weight poly (N-vinyl-2-pyrrolidone), a fractionated polymer such as the bottom layer produced in the treatment described in Example 3. A toluidine red presscake consisting of 100 grams pigment solids in 196 ml. of water is dispersed in a high shear blendor for 10 minutes in 1004 ml. of aqueous solution containing 37.9 grams of polymer. The slurry is stirred while adding incrementally a 17% aqueous $Na_2SO_4$ solution at the following rates: 500 ml. at 200 ml./min. for 25 minutes, 200 ml. at 10 ml./min. for 20 minutes, 50 ml. at 5 ml./min. for 10 minutes, 50 ml. at 2 ml./min. for 25 minutes, and 200 ml. at 5 ml./min. for 40 minutes. This is followed for a further addition of 400 ml. of 25% aqueous $Na_2SO_4$ solution at a rate of 10 ml./min. for 40 minutes. The slurry is stirred another 20 minutes, filtered and pressed. The encapsulated pigment contains about 72.5% toluidine red core and 27.5% polymer load.

The encapsulated pigment is recovered as an aqueous presscake containing about 48.3% total solids. This presscake is flushed into a medium oil length soya phthalate alkyd resin vehicle using conventional flushing techniques. In the flushing procedure, 150 parts by weight of the aqueous presscake is mixed with 200 parts of oil-modified alkyd vehicle consisting of 100 parts soya glyceryl phthalate resin in 100 parts mineral spirits solvent. The flushing operation is carried out in a laboratory scale sigma-blade mixer equipped with a heat exchange jacket and vacuum connections. A portion of aqueous pigment dispersion is charged to the vessel with a portion of the oleoresinous alkyd vehicle and a small amount of aminated rosin flushing aid. The mass is pulped by mixing with the sigma-blade mixer and warmed to about 50°C. To the flushed mass is added with mixing turkey red oil, lead acetate solution and more alkyd vehicle to break out the aqueous phase of the flushed mass, which is separated by decanting. A second charge of aqueous pigment dispersion is added and mixed thoroughly with the remainder of the alkyd vehicle. After separation of the aqueous phase, the organic pigmented vehicle is washed with 15% aqueous $Na_2SO_4$ solution and finished under vacuum to remove any remaining water. The flushed mass is thinned with additional alkyd resin, mineral spirits and xylene to give a final pigment core content of 22.2% (dry basis).

A sample of the encapsulated toluidine red pigment as prepared by the flushing procedure is incorporated into a full shade paint formulation with a medium soya alkyd vehicle. The paint was prepared to a pigment core content of 7% toluidine red. To this coating composition is added about 5 wt% drier blend, comprising mixed naphthates of cobalt, manganese and lead. The paint made with the encapsulated pigment has a higher original gloss than the standard untreated toluidine red paint using the same vehicle system, and the coating containing encapsulated pigment retains its gloss better when exposed to ultraviolet light. Standard 60° glossmeter measurements are taken for comparison and tabulated below.

Table I

| Exposure time (hours) | Gloss (60°) Encapsulated pigment | Gloss (60°) Untreated pigment |
|---|---|---|
| 0 | 87 | 77 |
| 529 | 80 | 63 |
| 1400 | 74 | 52 |

EXAMPLES 6-11

To demonstrate the salting out properties of various inorganic materials, comparative procedures were run on several cationic and anionic species. A standard poly (N-vinyl-2-pyrrolidone) solution is made up at 4% concentration in water. The aqueous salt solutions are prepared at a concentration of 17% solids. To compare the effect of the individual salts on the polymer solution, the salt is added incrementally to determine the amount required to begin precipitation of the polymer from solution and the amount required to complete the precipitation of the polymer. Each salt solution is added to 200 ml. of polymer solution. The results are tabulated below.

Table II

| Example No. | Salt | Ml. req'd to begin ppt. | Ml. req'd to complete ppt. |
|---|---|---|---|
| 6 | $Na_2SO_4$ | 125 | 185 |
| 7 | $(NH_4)_2SO_4$ | 200 | 330 |
| 8 | $M_gSO_4$ | 100 | 250 |

Table II-Continued

| Example No. | Salt | Ml. req'd to begin ppt. | Ml. req'd to complete ppt. |
|---|---|---|---|
| 9 | K$_2$SO$_4$ | 5 | 175 |
| 10 | NaCl | no ppt. | — |
| 11 | NaNO$_3$ | no ppt. | — |

The efficacy of individual salts may be determined by simple experiment for the particular polymer being used to coat the pigment substrate.

EXAMPLE 12

Hansa Yellow G pigment is encapsulated with a vinyl pyrrolidone polymer by dispersing an aqueous presscake containing 25 gm. pigment solids in 71.2 gm. water in a solution of 6.9 gm. poly (N-vinyl-2-pyrrolidone) in 229 ml. water. Over a 3 hour period 600 ml. acetone precipitation agent is added incrementally with rapid stirring. Stirring is continued at ambient temperature for 15 minutes and the dispersion is filtered to remove the liquid phase. The encapsulated pigment is slurried for 15 minutes with a mixture of 150 ml. acetone and 50 ml. water and filtered. This step is repeated with 170 ml. acetone and 30 ml. water; then repeated again with 190 ml. acetone and 10 ml. water mixture; and then again slurried with 200 ml. acetone and filtered. This procedure hardens the polymer layer by extracting most of the water from the precipitated polymer. The final acetone/pigment presscake can be air dried or heated to evaporate the acetone, giving a fine toner powder which has a pigment content of 78.4%.

The dry powder shows excellent bleed resistance when slurried in xylene solvent, remaining undissolved for several weeks where the untreated pigment dissolves in a few minutes at room temperature.

EXAMPLE 13

The method of Example 12 is followed except that 96.2 grams of Hansa Yellow G presscake containing 25.0 g. of dry pigment is dispersed in a solution of 6.9 g. polymer in 200 ml. of water with 1.8 g. dioctyl sodium sulfosuccinate anionic surfactant in a high shear blendor. The total volume is brought to 300 ml. with addition of water. To this slurry is added 17% aqueous Na$_2$SO$_4$ solution as follows: 100 ml. at 10 ml./min. for 10 minutes, 40 ml. at 5 ml./min. for 8 minutes, 40 ml. at 2 ml./min. for 20 minutes, 70 ml. at 5 ml./min. for 14 minutes and 100 ml. at 10 ml./min. for 10 minutes. The stirring is continued for another 5 minutes, and another 1.8 g. of surfactant is added as an aqueous alcohol solution, followed by an additional 10 minutes of stirring. The slurry is filtered, redispersed 2 minutes in 200 ml. acetone, refiltered, washed in acetone and dried. The powdered product is easily ground. The dry toner, containing about 77.6% pigment core and 22.4% polymer load possesses very good resistance to xylene.

When incorporated in a soya phthalate alkyd resin pigmented with titanium dioxide, the encapsulated pigments are more lightfast than a comparable paint made with untreated Hansa Yellow G pigment, fading approximately half as much as the untreated pigment when exposed for 790 hours on a carbon arc fadeometer. Full shade paints made with the encapsulated pigment show no bleeding through white lacquer overstripes, compared with untreated pigment which bleeds profusely under the same conditions.

While the invention has been shown by specific examples, there is no intent to limit the invention except as set forth in the following claims.

We claim:

1. An encapsulated pigment material of substantially discrete particles which consist essentially of a solid core of colored azo organic pigment having an average particle size in the range of about 0.1 to 10 microns; and a substantially continuous outer layer consisting essentially of a transparent vinyl pyrrolidone polymer deposited on the core, the weight of polymer being about 5 to 100 parts per 100 parts of the core, the polymer being soluble in water and substantially insoluble in aromatic, aliphatic and alicyclic hydrocarbons, and the outer layer having a thickness of at least 10 A.

2. The pigment material of claim 1 wherein the weight of polymer is about 20 to 50% of the core weight.

3. The pigment material of claim 1 wherein the polymer has an average molecular weight of at least about 300,000.

4. The pigment material of claim 1 wherein the organic pigment is toluidine red or hansa yellow.

5. The pigment material of claim 1 wherein the polymer consists essentially of a water soluble linear addition polymer containing at least 90 percent repeating units of the structure:

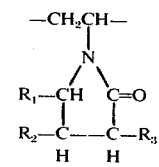

where R$_1$, R$_2$ and R$_3$ are selected from hydrogen and lower alkyl radicals having 1 to 4 carbon atoms.

6. A process for preparing a stable dispersion of an encapsulated organic pigment in an organic vehicle which comprises the steps of:
   slurrying organic pigment particles comprising a finely divided organic pigment having an average particle size of about 0.1 to 10 microns in an aqueous mixture of vinyl-pyrrolidone polymer;
   precipitating the polymer onto the surface of the organic pigment particles to encapsulate the pigment with a substantially uniform polymeric layer comprising about 5 to 100 parts polymer per 100 parts by weight of pigment;
   separating the encapsulated pigment from the aqueous mixture and recovering an aqueous presscake of the encapsulated pigment;
   flushing the encapsulated pigment into a soft organic vehicle to transfer the encapsulated pigment from an aqueous presscake to a dispersion of pigment in organic vehicle.

7. A process for encapsulating 0.1 to 10 micron organic pigment particles having polar groups which comprises slurrying said particles in an aqueous solution of poly (N-vinyl-2-pyrrolidone), said solution containing about 1 to 10wt% of polymer;
   precipitating a substantially continuous layer of the polymer onto the pigment particles by displacing about 5 to 100 parts by weight of polymer per 100 parts of pigment from the aqueous solution with a water-soluble substance to encapsulate the pigment as substantially discrete particles having a polymer layer of at least 10 A average thickness, and separating the encapsulated pigment particles from the aqueous mixture.

8. In the process for encapsulating finely divided organic pigment particles with a polymeric outer layer, the improvement which comprises:

slurrying the pigment particles, having an average particle size of about 0.1 to 10 microns, in an aqueous solution of water-soluble linear addition polymer containing at least 90 percent repeating units of the structure:

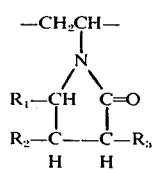

where $R_1$, $R_2$ and $R_3$ are selected independently from hydrogen and lower alkyl radicals having 1 to 4 carbon atoms;

precipitating about 5 to 100 parts by weight of polymer per 100 parts of pigment onto the pigment particles to form a substantially continuous outer layer by displacing the polymer from aqueous solution with a water-soluble precipitant; and recovering the encapsulated pigment particles from the aqueous mixture of polymer and precipitant as substantially discrete particles having an average particle size of about 0.1 to 10 microns.

9. The process of claim 8 wherein the polymer has an average molecular weight of at least about 300,000; and wherein the organic pigment has polar groups for forming bonds with the polymer structure.

10. The process of claim 9 wherein the precipitant consists essentially of a water-soluble inorganic salt.

11. The process of claim 9 wherein the precipitant consists essentially of water miscible organic liquid which is not a solvent for the polymer.

12. The process of claim 9 wherien the pigment consists essentially of azo pigment.

13. The process of claim 12 wherein the azo pigment is toluidine red.

14. The process of claim 12 wherein the azo pigment is Hansa Yellow G.

15. The process of claim 9 wherein the polymer consists essentially of poly (N-vinyl-2-pyrrolidone), and wherein the amount of polymer deposited is about 20 to 50 wt% of the pigment core.

16. The process of claim 8 wherein the aqueous solution of polymer contains about 1 to 4 wt% of a vinyl pyrrolidone polymer.

17. The process of claim 8 including the steps of recovering the encapsulated pigment as an aqueous presscake and flushing the encapsulated pigment into an alkyd resin vehicle.

18. The process of claim 8 wherein the aqueous slurry of pigment particles and aqueous polymer solution contains an effective amount of surfactant.

* * * * *